(No Model.) 8 Sheets—Sheet 1.
A. W. JOHNSON.
LOOM FOR WEAVING SHORT WEFTS.
No. 495,112. Patented Apr. 11, 1893.
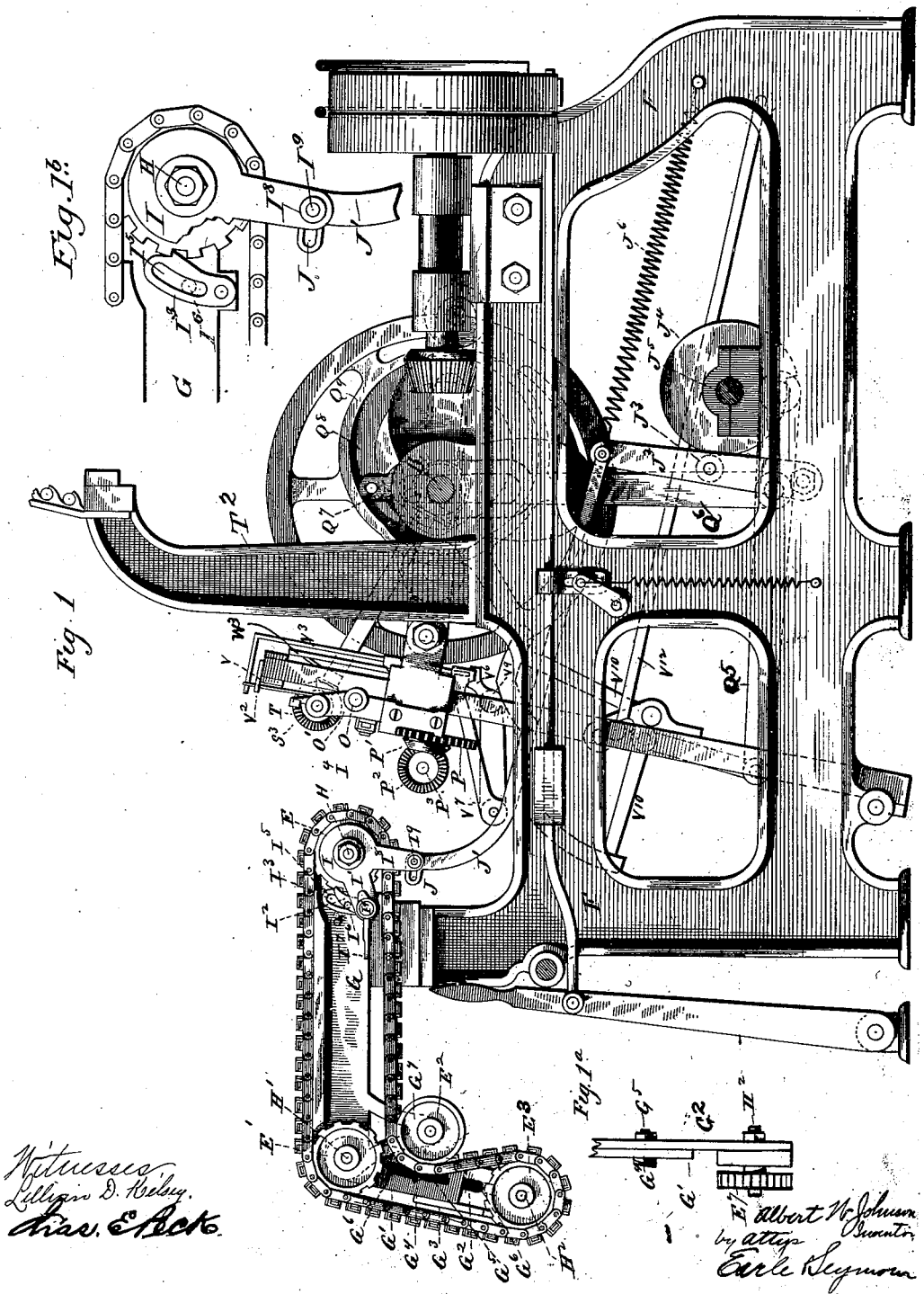

(No Model.) 8 Sheets—Sheet 2.
A. W. JOHNSON.
LOOM FOR WEAVING SHORT WEFTS.
No. 495,112. Patented Apr. 11, 1893.
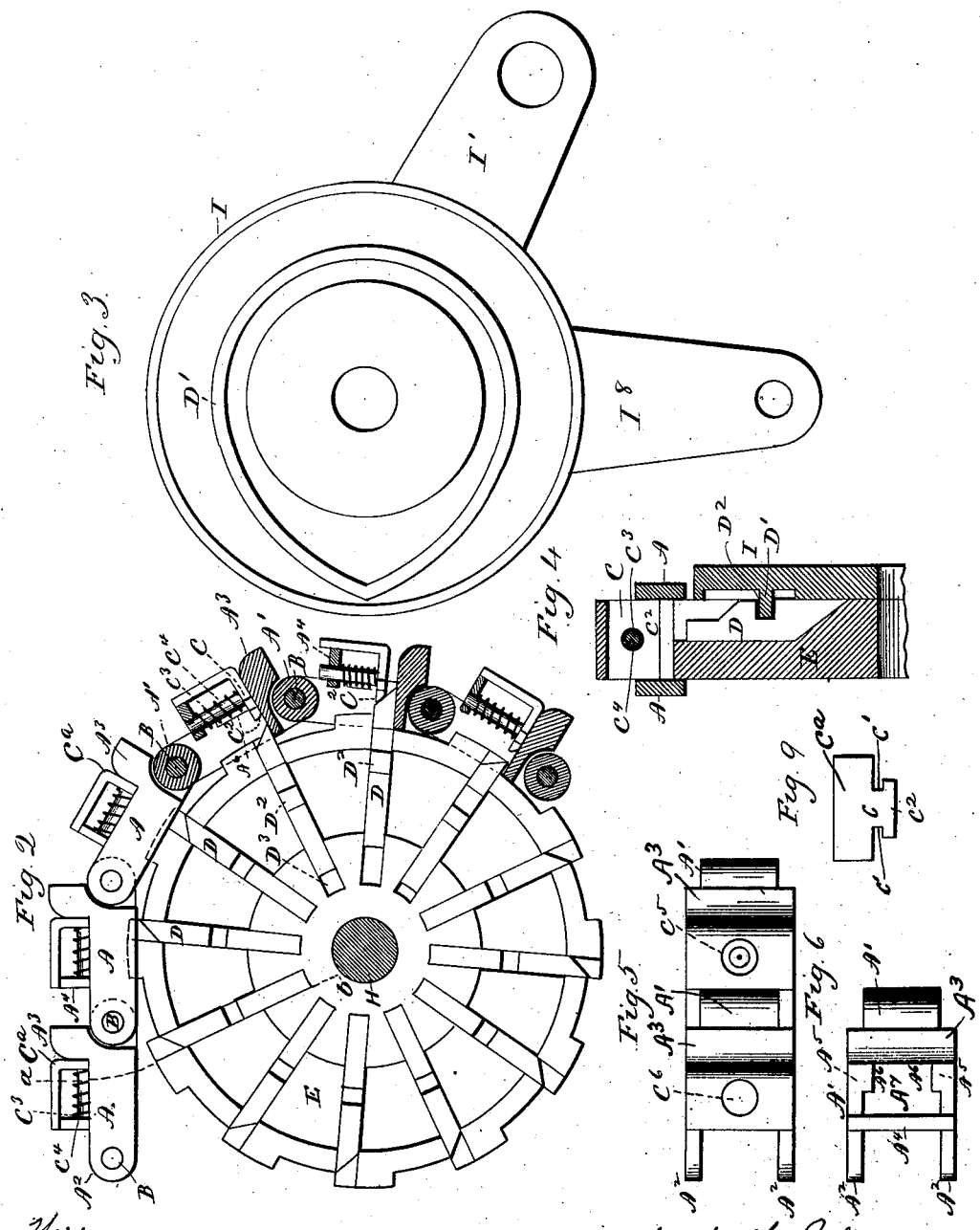

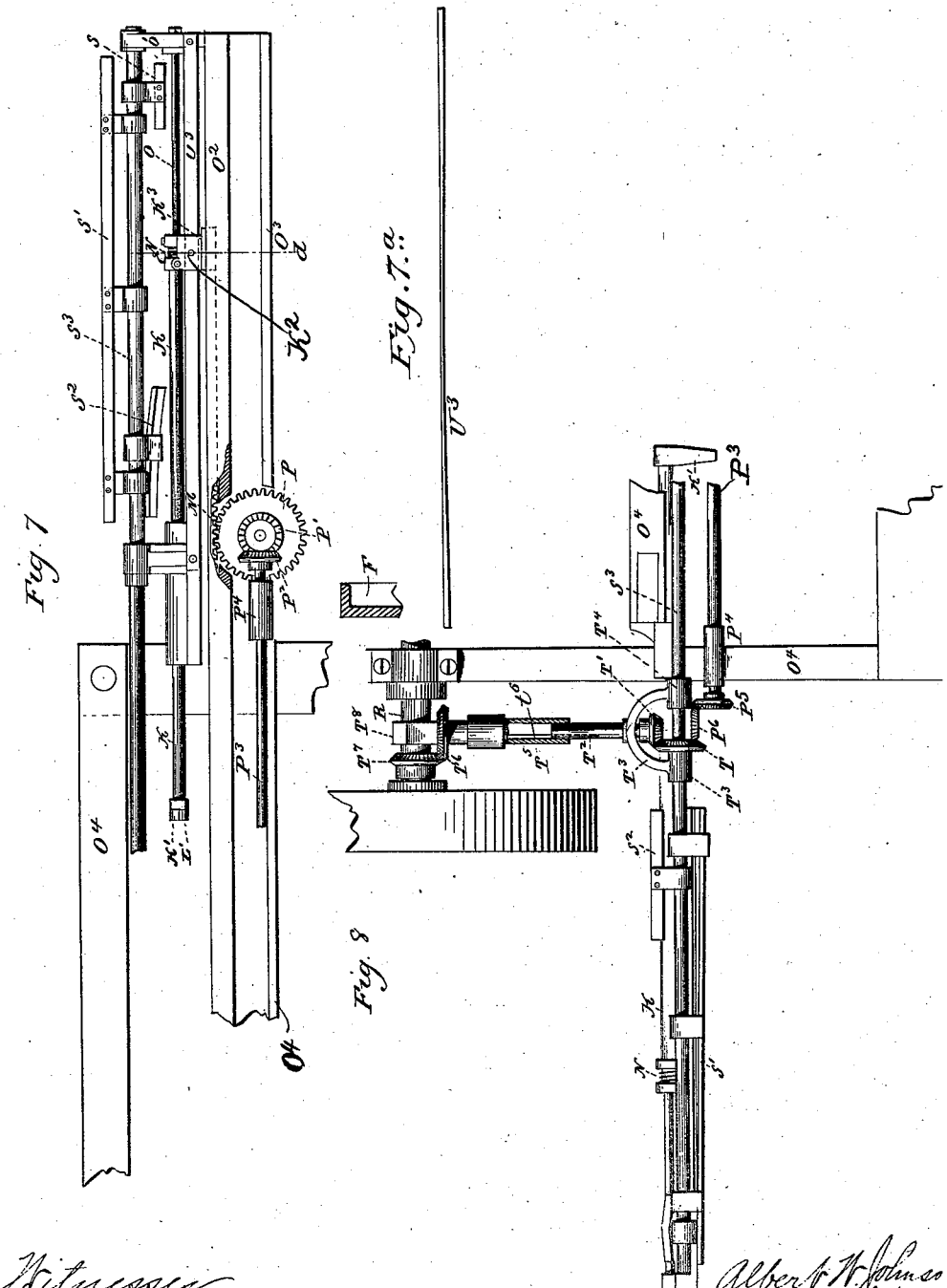

(No Model.) 8 Sheets—Sheet 4.
A. W. JOHNSON.
LOOM FOR WEAVING SHORT WEFTS.
No. 495,112. Patented Apr. 11, 1893.
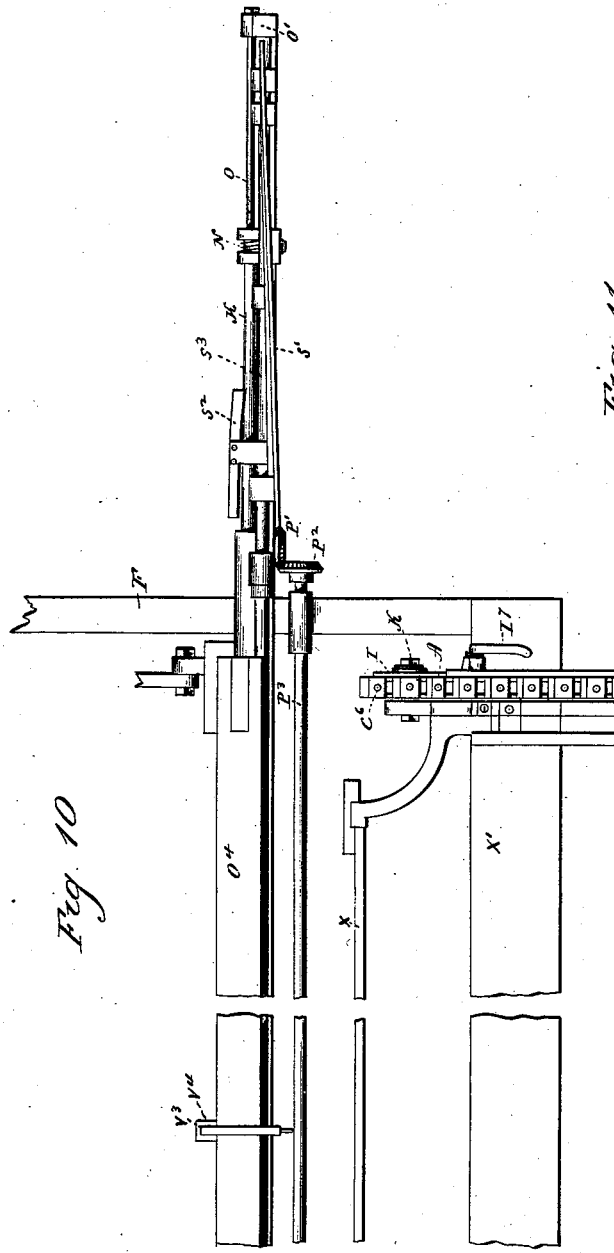
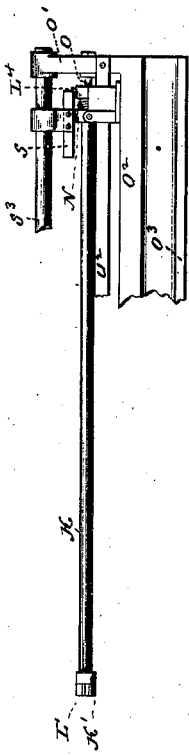

(No Model.) 8 Sheets—Sheet 5.
A. W. JOHNSON.
LOOM FOR WEAVING SHORT WEFTS.
No. 495,112. Patented Apr. 11, 1893.
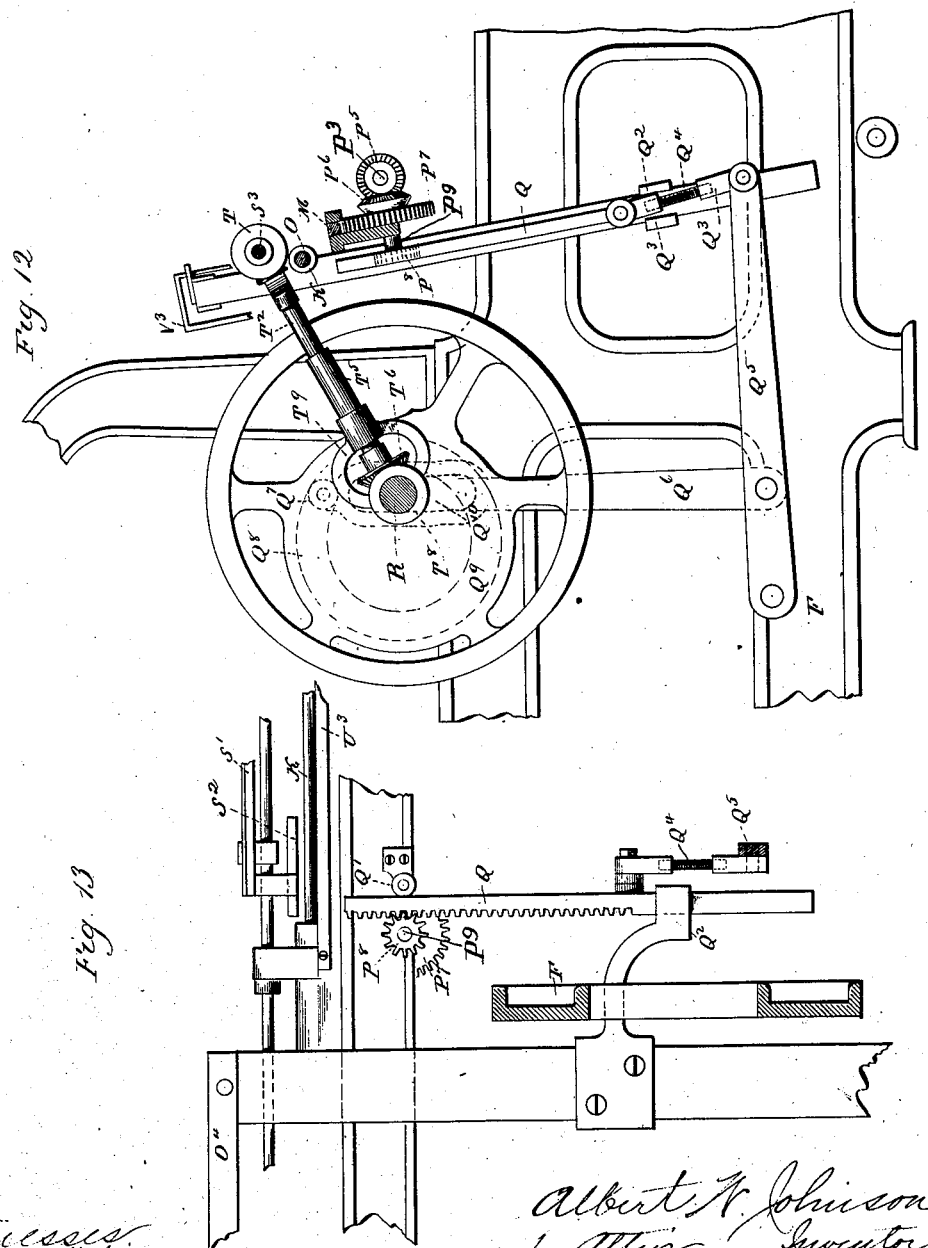

(No Model.) 8 Sheets—Sheet 6.
A. W. JOHNSON.
LOOM FOR WEAVING SHORT WEFTS.
No. 495,112. Patented Apr. 11, 1893.
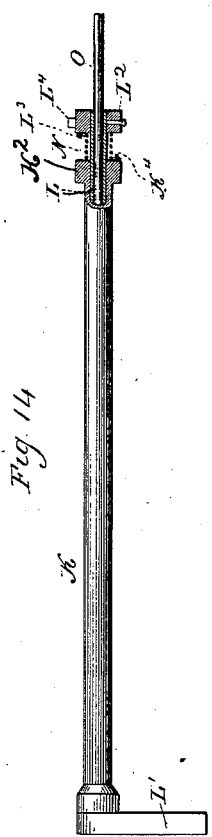
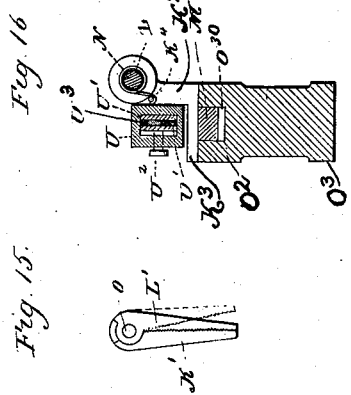

(No Model.) 8 Sheets—Sheet 7.
A. W. JOHNSON.
LOOM FOR WEAVING SHORT WEFTS.
No. 495,112. Patented Apr. 11, 1893.
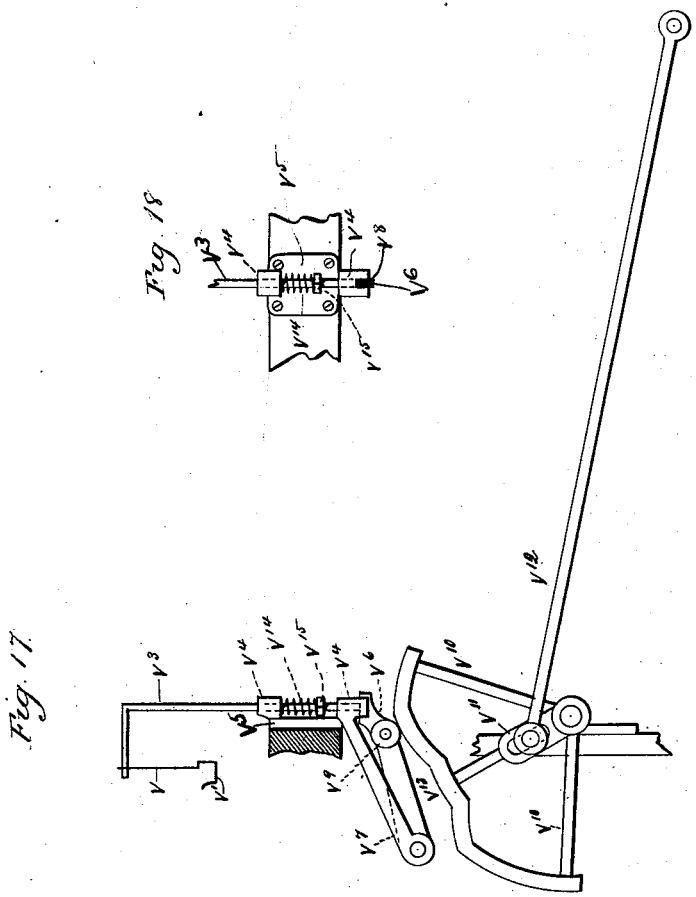

(No Model.) 8 Sheets—Sheet 8.
A. W. JOHNSON.
LOOM FOR WEAVING SHORT WEFTS.
No. 495,112. Patented Apr. 11, 1893.
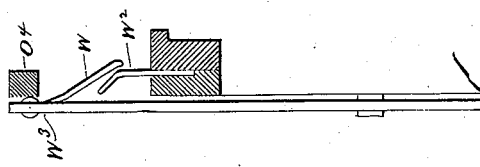
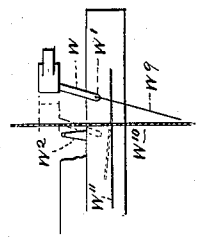
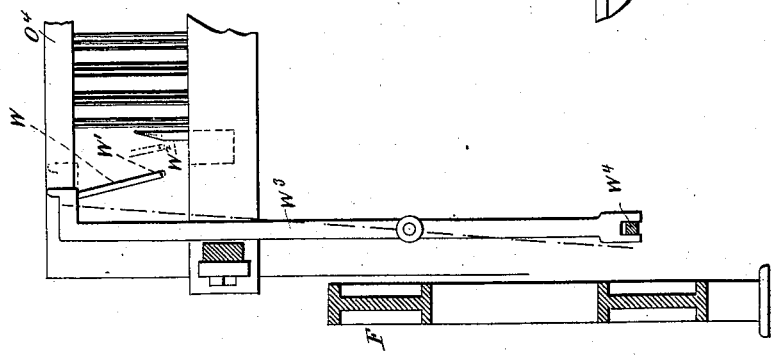

UNITED STATES PATENT OFFICE.

ALBERT W. JOHNSON, OF NEW HAVEN, ASSIGNOR TO THE MITCHELL MANUFACTURING COMPANY, OF MILFORD, CONNECTICUT.

LOOM FOR WEAVING SHORT WEFTS.

SPECIFICATION forming part of Letters Patent No. 495,112, dated April 11, 1893.

Application filed July 10, 1890. Serial No. 358,309. (No model.)

*To all whom it may concern:*

Be it known that I, ALBERT W. JOHNSON, of New Haven, in the county of New Haven and State of Connecticut, have invented new Improvements in Looms for Weaving Short Wefts; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of one form which a loom embodying my invention may assume; Fig. 1$^a$ a detached broken view in side elevation showing the adjustable member of the wheel-frame seen in the preceding figure; Fig. 1$^b$, a detailed view on a larger scale, to show the safety pawl I$^3$ which is exposed by breaking away the arm I' of the plate I; Fig. 2, a detached enlarged view in vertical section showing one of the radially slotted sprocket-wheels, the wedges in the slots thereof, and a portion of the weft-feeding chain the links thereof are acted upon by the wedges to release the wefts. Fig. 3, is a detached, enlarged view in inside elevation of the oscillating cam-plate which intermittently rotates the said sprocket wheel and actuates the wedges therein. Fig. 4, is a view in vertical section on the scale of the last two preceding figures and on the line $a$—$b$ of Fig. 2. Fig. 5, is a detached plan view of two links of the chain. Fig. 6, is a detached plan view of the frame of one of the links. Fig. 7, is a broken view in side elevation of the weft-carrier located at the right hand end of the lathe and its supporting and operating adjuncts; Fig. 7$^a$, a detached plan view of the bar U$^3$, forming a member of the friction device associated with each weft-carrier. Fig. 8, is a broken plan view of the corresponding parts located at the left hand end of the lathe, together with the driving connections of the wiper-shaft and some of those of the rock-shaft. Fig. 9, is a detached view in front elevation of the movable jaw of one of the weft-holding links. Fig. 10, is a broken plan view of the right hand end of the lathe, the weft-carrier thereof, the right hand weft-feeding chain and the roll and breast-beam of the loom. Fig. 11, is a detached view in side elevation of the same weft-carrier at the limit of its outstroke. Fig. 12, is a view in side elevation and partly in section of a part of the loom from its left hand end and particularly showing the means for driving the weft-carriers and the wiper-shaft. Fig. 13 is a detailed view taken from the left hand end of the loom and showing in rear elevation the upright rack which drives the horizontal racks to which the weft-carriers are secured. Fig. 14 is a detached plan view partly in section of one of the weft-carriers. Fig. 15 is a view thereof in end elevation looking toward the nippers. Fig. 16 is a view in vertical transverse section on the line $c$—$d$ of Fig. 7, and showing the friction device for checking the inertia of the weft-carrier at the end of its stroke. Fig. 17 is a detached view in side elevation of the mechanism employed for controlling the inertia of the individual weft. Fig. 18 is a detached view in rear elevation of the bearing plate of the said device. Fig. 19 is a view in rear elevation of the right hand end of the lathe, showing my improved selvage forming mechanism. Fig. 20 is a view of the same partly in vertical section and partly in side elevation, and Fig. 21 is a plan view in the nature of a diagram and illustrating the turning over of a weft end upon the fabric for incorporation thereinto in the formation of the selvage.

My invention relates to an improvement in looms for weaving short wefts, the object being to increase their productive capacity by adapting them to be run at a higher rate of speed than has heretofore been possible in this class of machines, to provide for handling the wefts so as to reduce the breakage of the same to a minimum, to improve the selvage mechanism by reducing the number of its parts, to provide for checking the wefts as they are drawn into the fabric to prevent their inertia from carrying them too far, and this without straining or chafing the warp threads; and to generally simplify the several parts of the loom so as to render it available for operation by unskilled labor, and to make it simple to construct, and easy to drive and to repair.

With these ends in view, my invention consists in a weft-feeding-chain composed of weft-holding links; in means for automatically releasing the wefts from the links at the time they are seized to be incorporated into the fabric so that they will not be strained or broken when being disengaged from the links; in two horizontally reciprocating weft-carriers, respectively located opposite each other in the same line at opposite sides of the loom, and transferring the wefts from one to the other alternately in the center of the fabric; in special means for operating the said carriers; in a vertically reciprocating foot for checking the wefts as they are drawn into the fabric; in a selvage mechanism having an oscillating finger carrying the turn-over cord, and arranged to operate in front of the selvage-beater, and in certain other details of construction and combinations of parts as will be hereinafter described, and pointed out in the claims.

I would explain at the outset that the loom to which my improvements are applied may be of any approved construction. I do not, therefore, limit myself to their use in connection with the loom of the form and general construction herein shown.

For convenience in considering the several features of my invention, I will describe them in the order of the delivery to, and progress of, the wefts through the loom.

The wefts, it will be understood, are alternately taken from opposite sides of the loom, which is thereto provided with two weft-feeding chains respectively located at such points. As these are alike in construction, description of one will suffice for both. Each of the said chains, is composed of a series of weft-holding links, each consisting of a frame A, provided at its forward end with a longitudinally perforated knuckle A' and at its rear end with two perforated ears $A^2$ $A^2$, for its attachment by pins B, to other links of like construction. Each link is also provided at its forward end with a beveled outwardly projecting fixed jaw $A^3$, and at its rear end with a parallel perforated outwardly projecting web $A^4$, and with a flat bearing surface $A^5$ located between the said jaw and web, and traversed by a longitudinal opening $A^7$ which is flanked on each side at its front end by a rib $A^6$ and enlarged at its rear end to form a clearance space, the purpose whereof will be mentioned later on. Each link is provided with a movable jaw $C^2$ having its forward end turned down to form a tongue C, which co-operates with the fixed jaw $A^3$ of the frame to hold the weft, and is notched at its opposite edges and near its lower end, as at C', C', to receive the ribs $A^6$, $A^6$, with which it is engaged by first introducing it into the enlarged rear end of the opening $A^7$ and then moving it forward therein. The extreme lower edge of the tongue is beveled, as at $C^2$, to co-operate with the beveled ends of the wedges D, by means of which the movable jaws are automatically pushed back to release the wefts, as will be presently described.

The tongue of the movable jaw of each link is constantly urged forward toward the fixed jaw, with which it co-operates to hold the wefts, by means of a spiral spring $C^3$ interposed between the inner faces of the tongue and web, and encircling a pin $C^4$ secured to the tongue, and extending rearwardly through a perforation in the web $A^4$ in which it plays back and forth. It will be observed that the holding surfaces of the respective stationary and movable jaws of the weft-holding links, stand at about a right angle to the length of the chain. This enables the wefts to be fed directly downward into the links instead of being drawn horizontally under springs, as has been necessary heretofore. The rear end of the movable jaw extends horizontally over the said web, and is provided with a circular recess $C^5$ designed to receive a small colored tablet or wafer $C^6$, which will indicate to the person feeding the loom the color of the weft to be inserted between the fixed and movable jaws.

The colors in the links will be arranged in a predetermined order which will result in the production of a certain pattern in the fabric as woven, and the colors will be rearranged every time the pattern is changed. The changing of the pattern will often necessitate varying the number of links in the chain which will ordinarily be adapted in length to reproduce any given pattern once, but as patterns vary in character and in size, some provision must be made for changing the length of the chain by adding links to or removing the same from it. Each of these chains is carried upon an independent series of wheels E, E' $E^2$ and $E^3$, respectively located at opposite sides of the forward end of the loom-frame F, which is thereto provided at the said sides with two adjustable, extensible wheel-frames, each composed of a rigid horizontal member G, a pivotal member G', attached to the outer end thereof, and an extensible member $G^2$ having its inner end provided with flanges $G^3$ $G^3$ adapting it to clasp the outer end of the pivotal member G' so as to be longitudinally movable thereon, the part $G^2$ being held in its adjustment by means of a nut $G^4$ and a clamping-bolt $G^5$ which passes through elongated slots $G^6$ $G^6$ respectively formed in the said parts. The wheel E is located at the inner end of the part G, on a short shaft H, the wheel E' at the outer end of the said part upon the pin H' which forms the fulcrum for the pivotal part G', the wheel $E^2$ which is an idler, at the lower end of an arm $G^7$ depending from the part G, and the wheel $E^3$ at the outer end of the extensible part $G^2$ upon a stud $H^2$ mounted therein. By arranging the part or member G of the frame in a horizontal position, a portion of the chain is caused to move horizontally for convenience in feeding the wefts to its links, while by pivoting another member of the frame, the same may be turned down and economy of room is secured. By making one part of the frame adjustable, wear in the chain may be compensated for, and the chain lengthened or shortened according to the exigencies of the pattern to be woven. The construction herein shown simply indicates the principle on which the frame is made. If desired it may be made for carrying a very long chain and to be widely adjustable, and it may even be arranged to pass down through an opening in the floor of the room in which the loom stands.

It has been mentioned before, that the wefts are alternately fed from opposite ends of the loom. In harmony with this principle of operation, the chains are alternately operated to successively move their links into the range of the weft-carriers which will be described later on, by means of two independent actuating mechanisms, and these being identical in every particular, description of one will suffice for both. Each of these mechanisms comprises a two-armed plate I, loosely mounted upon the outer end of the shaft H on which the wheel E is also loosely mounted, the arm I' of the plate being provided with an operating pawl I$^2$ adapted to engage with the cogs of the wheel. A safety-pawl I$^3$ also adapted to engage with the cogs of the wheel, and pivoted to the outer face of the part G of the wheel-frame, prevents the retrogression of the wheel. The said safety-pawl has formed in it a segmental slot I$^5$ receiving a pin I$^6$ projecting into it from the inner face of the operating-pawl I$^2$ with which the safety-pawl is then coupled, so that both pawls may be simultaneously disengaged from the wheel by depressing the outer end of a small manual I$^7$ secured to the outer end of the shaft I$^4$ on which the operating-pawl is mounted. The other arm I$^8$ of the said plate I, carries a clamping-bolt I$^9$, passing through a horizontally elongated slot J formed in the upper end of a curved pitman J' the opposite end whereof is pivotaly secured to the upper end of an upright arm J$^2$ pivoted at its lower end to the frame of the machine, and provided between its ends with an anti-friction roller J$^3$ which is engaged by a cam J$^4$ mounted on a shaft J$^5$ carrying at its opposite end a like cam operating the corresponding actuating mechanism on the other side of the loom. A heavy spiral spring J$^6$ secured to the upper end of the arm J$^2$ and leading to the rear end of the loom-frame operates through the said pitman and cam-plate to pull the pawls down into position for engagement with the teeth of the wheel E. The slot J before mentioned, enables the connection between the pitman and the two-armed plate to be adjusted so as to impart to the latter just the amount of movement desired. The timing of this part of the loom is of course effected through the cam J$^4$ in the ordinary manner.

It will be readily understood from the foregoing that the motion derived from the cam J$^4$ will oscillate the plate I and impart an intermittent rotary movement to the wheel E, and so advance the chain in a step-by-step movement in which every step means the delivery of a weft to the weft-carrying devices. The oscillation of the said plate also operates to release the wefts from the links. This is done by means of a cam D' formed upon the inner face of the plate and entering transverse slots D$^2$ formed in the outer faces of the radial series of wedges D located in radial slots D$^3$ formed in the outer face of the wheel E, and opening out into the periphery thereof, so that under the combined action of the cam and the oscillating-plate, the said wedges are shot out of their slots, and entered between the beveled lower ends of the tongues of the movable jaws and the stationary jaws of the respective links, whereby the same release the wefts and permit the same to be readily moved by the weft-carrier. It will be understood that the rotation of the wheel E carrying the wedges, causes them to ride upon the cam and be gradually lifted or thrown out into position for receiving the shooting impulse from the point of the cam which the same derives from the oscillation of the plate.

The wefts are engaged with the links of the weft-feeding-chains so that their inner ends project beyond the inner edges thereof, while their main length is outside of the chains. The wefts, thus arranged, are carried into the fabric for incorporation thereinto by means of two horizontally reciprocatable weft-carriers respectively located at opposite sides of the loom and opposite each other in the same line, and constructed to transfer the wefts from one to the other alternately in the center of the fabric. These weft-carriers are alike in construction and operation and only one need be described. For this purpose the weft-carrier at the right hand end of the lathe has been chosen as it has been the most fully illustrated. The said weft-carrier comprises a tube K, provided at its inner end with a rigid nipper jaw K' extending at a right angle to it, and an inner tube L, located within the outer tube, and rotatable but not longitudinally movable therein, and provided at its inner end with a corresponding nipper jaw L' having its inner face serrated and cooperating with the other nipper jaw to seize and hold the wefts. The outer end of the outer tube K is rigidly secured to an upright sliding block K$^2$ having a horizontal lateral foot K$^3$ which is secured to the upper face of the outer end of a rack M to be described at another time. The outer end of the inner tube projects beyond the outer end of the outer tube, and has a circular head L$^2$ attached to it so as to leave a space between the same and the block K$^2$. A spiral spring N located in the space before mentioned, and having its ends respectively engaged with pins K$^4$ and L$^3$ respectively projecting toward each other from the block and head, is arranged so as to exert a constant effort to rotate the inner tube so as to bring the acting face of the nipper jaw carried by it into contact with that carried by the other tube, whereby the two nipper jaws are normally shut together under the influence of the spring. Against the opposition of the spring the jaws are separated by the right rotation of the inner tube by means of an operating pin or finger $L^4$ projecting radially from the periphery of the circular head $L^2$, in position to be engaged by suitable instrumentalities which will be detailed at another time. A rod O entered into the outer end of the inner tube and provided for steadying the action of the carrier, is rigidly secured at its outer end to the end-piece $O'$ of the carrier-frame, composed of the said piece, and the rack-beam $O^2$ and the brace $O^3$, and forming an extension of the end of the lathe $O^4$ which is provided at its opposite end with a corresponding frame. The sliding-block $K^2$ before mentioned has sliding bearing upon the upper face of the rack-beam $O^2$ which is provided with a long slot $O^{30}$ to receive the horizontal rack M to which the block is secured and which plays back and forth in the said slot. The rack is driven by an intermittently and alternately reversed pinion P carrying upon its outer face a beveled gear $P'$ into which meshes a corresponding bevel-gear $P^2$ secured to the outer end of a rock-shaft $P^3$ mounted in bearings $P^4$, $P^4$, attached to the lathe and extending to the other end thereof where it is provided with a bevel-gear $P^5$ meshing into a bevel-gear $P^6$ secured to the outer face of a pinion $P^7$ which meshes into the horizontal rack M attached to the sliding-block of the carrier at the left hand end of the lathe.

As far as described the two weft-carriers and the means for mounting and driving them are alike. They have, however, but one power connection and that is at the left hand end of the lathe where the shaft $P^9$ of the pinion $P^7$ is extended transversely through the lathe, and provided at its rear end with a pinion $P^7$ engaged by an upright reciprocatable rack Q, held in mesh with it by an anti-friction roll $Q'$, guided at its lower end in an arm $Q^2$, and connected by a longitudinally adjustable pitman composed of two corresponding parts $Q^3$ $Q^3$, and a screw $Q^4$ uniting them, with the forward end of a horizontal lever $Q^5$ hung at its rear end upon the loom frame, and alternately raised and depressed to reciprocate the upright rack, by means of a vertical link $Q^6$, the lower end whereof is connected with it. The upper end of the link is provided with an anti-friction roll $Q^7$ entering a cam-groove $Q^8$ formed in a cam $Q^9$ secured to the main-shaft R of the loom, the said shaft passing through a clearance slot $Q^{10}$ formed in the upper end of the link which it guides. It will thus be seen that the reciprocation of the upright rack will cause the horizontal racks and hence the weft-carriers, to simultaneously advance and retire, alternately.

Referring again to the weft-carrier at the right hand end of the lathe, the inner tube L is rotated within the outer tube K, to carry the nipper jaw of the latter away from that of the former, by the engagement with the operating pin $L^4$ mounted in the head $L^2$ secured to the outer end of the inner tube, of wipers S, $S'$ and $S^2$ mounted upon a shaft $S^3$ having bearing at its ends in the respective carrier-frames which extend beyond the ends of the lathe. The said shaft rotates constantly and engages the wipers with the said pin as the same is brought into range with them in the reciprocation of the carrier. The wipers are adapted in length, in longitudinal conformation and in concentric arrangement to operate the nipper of the inner tube properly. For convenience and clearness of description, their construction, arrangement and operation will be described together, and this description will be made clearer by distinguishing the alternate strokes of the weft-carrier as its "feeding" and "receiving" strokes, the former term being used to designate the stroke of the carrier during which it carries a weft into the fabric and delivers it to the other carrier, and the latter term being chosen to identify the stroke of the carrier during which it has the weft delivered to it by the other carrier in the center of the fabric. The short wiper S located at the outer end of each wiper-shaft is arranged so that just before the carrier reaches the end of its receiving outstroke, at which time it carries a weft, the wiper will engage with the operating pin $L^4$ and rotate the inner tube of the carrier, and so separate the nipper jaws just in time to drop the weft when the same has been drawn into place between the warp-threads. The carrier continuing to move outward, the wiper will keep the nippers open to adapt them to receive the weft presented to them for feeding by the weft-feeding chain when the lathe is swung forward into range therewith. Then after the nipper jaws have been moved up over the end of the said weft, the wiper is disengaged from the pin $L^4$, which permits the nipper jaws to close upon the weft after which one of the wedges D operates to open the link, carrying the weft, and releases the same. It will thus be seen that the short wiper S begins to act on the carrier when the same is completing its receiving outstroke and continues to act until after the receiver has begun its feeding instroke, and that it separates the nipper jaws for releasing a fed weft and receiving a weft to be fed.

The wiper $S'$ is the longest of the three wipers and is longitudinally bent concentric with the wiper-shaft with reference to the rate at which the same rotates, whereby it is adapted to be constantly engaged with the pin $L^4$ during an entire half stroke of the carrier. This wiper is arranged to engage with the said pin to separate the nipper of the carrier at the conclusion of the feeding instroke thereof, but not until after the weft carried into the fabric by it has been closed upon by the nipper jaws of the other carrier. The nipper jaws having been separated, as described, are so sustained by the said wiper during the entire feeding outstroke of the carriers, so that they cannot possibly foul the weft delivered by them to the other carrier as the said weft is drawn through or by them, for although the weft is likely to spring out of the way and clear the nipper jaws of its own accord, if they were allowed to close before the weft had been drawn into place, they might possibly close upon it. After the weft has been drawn to place, the said wiper is disengaged from the said pin and the nipper jaws close, and so go inward on the receiving instroke of the carrier.

The wiper $S^2$ is between the other two wipers in length, and located in line with the inner end of the long wiper $S'$. This wiper is slightly bowed longitudinally and arranged to engage with the pin $L^4$ and open the nipper jaws at the conclusion of the receiving instroke of the carrier, to adapt them to receive a weft from the other carrier, after which it is disengaged from the said pin, to let the nipper jaws close upon the weft. Then after the nipper jaws have been closed upon the weft, those of the other carrier will be opened to release it. It will thus be seen that the several wipers operate to open the nipper jaws of the carrier as required to adapt them to receive and release the wefts. It will be noted also that from the time a weft is engaged with a link of the weft-feeding chain, it is never freed, but always held firmly by some agency, one set of nipper jaws never letting go of it until the other set have seized it. The said wiper-shaft $S^3$ as has been explained, extends entirely across the length of the lathe and to the ends of the respective carrier-frames in which it has bearing, and the two sets of three wipers each located at its respective ends, are alike in construction and relative arrangement. The two sets, however, are arranged so as to harmonize with the alternate feeding of the wefts, first from one side of the loom and then from the other side thereof. The wiper-shaft which makes but one complete revolution to every two complete movements of the weft-carrier, is driven from its left-hand end by means of a bevel-gear T, (see Fig. 8) secured to it just outside of the left hand end of the lathe and meshing into a bevel-gear $T'$ located upon the outer end of a shaft $T^2$ supported at the said end by means of a yoke $T^3$, the arms whereof terminate in sleeves $T^4$ $T^4$ through which the wiper-shaft passes. The said shaft $T^2$ enters the outer end of a larger shaft $T^5$ to which it is secured so as to have longitudinal but not rotary movement therein by a spline $t^6$. The inner end of the shaft $T^5$ is provided with a bevel-gear $T^6$ meshing into a bevel-gear $T^7$ mounted on the main shaft R, which passes through a sleeve $T^8$ formed at the end of the arms of a yoke $T^9$ located in a vertical plane, and forming a bearing for the inner end of the said shaft $T^5$ which with the shaft $T^2$ forms a compound extensible or telescopic shaft, which adapts itself in length to the position of the lathe which is swung back and forth in the usual manner, while the main and wiper shafts form fulcra for the yoke-bearings of the shafts $T^2$ and $T^5$ to turn upon conformably with the swinging action of the lathe. The said yoke $T^9$ has been omitted from Fig. 9 of the drawings, but is well shown in Fig. 12 thereof.

In order to break the inertia which the weft-carriers require in being reciprocated, and particularly at the ends of their strokes, I employ an independent friction-device for each weft-carrier. This consists as herein shown of a box U connected with the outer face of the sliding block $K^2$ of the carrier, a friction packing $U'$ located in the box, a tension screw $U^2$ mounted in the box and arranged to compress or relieve the packing, and a bar $U^3$ passing through the packing, extending parallel with the carrier, supported at its ends in the carrier-frame, and made thinner in cross-section at its center than at its ends, so that the friction of the packing upon the bar will be relieved at the center of the stroke of the carrier, and applied at the ends thereof. It is apparent that I may arrange this friction device in other ways than herein shown, and I would have it understood that I do not limit myself to the construction illustrated and described. It is also necessary to provide some means for overcoming the inertia imparted to the wefts as they are drawn into the fabric, and to prevent their ends from being carried too far beyond the edges of the same. For this purpose I employ a rod V, consisting of a light wire bent at its lower end to form a presser-foot $V'$ which extends down between the warp-threads, in position to engage directly with the incoming wefts just long enough to break the force of their movement. The upper end of this rod passes through a small plate $V^2$ or other suitable device secured to the upper forward edge of the lathe, and guiding its reciprocation, and is connected with the forwardly bent upper end of a vertically reciprocatable operating-rod $V^3$ having its lower end mounted to slide freely up and down in two bearings $V^4$ $V^4$ formed integral with and extending rearwardly from a bearing-plate $V^5$ secured to the rear face of the lathe midway the length thereof. The said rod which extends through the lower bearing $V^4$, is sustained in a normally elevated position in which it holds the presser-foot above the path of the incoming wefts, by means of a lever $V^6$ pivoted at its forward end to a rigid arm $V^7$ formed integral with the plate $V^5$ and extending forward therefrom under the lathe. The free end of the said pivoted lever or arm engages with and supports the lower end of the operating rod $V^3$ with which it is held in alignment by entering it into a slot $V^8$ formed in the lower edge of the lower bearing $V^4$. The said arm carries an anti-friction roller $V^9$, and is itself supported by the engagement thereof with the edge of a quadrant $V^{10}$ fulcrumed to the stock of the lathe and provided with a slotted arm $V^{11}$ through which it is adjustably connected with a long rod $V^{12}$ the opposite end whereof is attached to the rear end of the loom-frame. A depression $V^{13}$ formed in the edge of the quadrant permits the arm to drop down when its roller is carried over the said depression in the forward movement of the lathe. The dropping of the pivotal arm, as described, is at once followed by a downward movement of the operating rod under the action of a spiral spring $V^{14}$ encircling it, and located between a collar $V^{15}$ mounted upon it and the upper bearing $V^4$. As the rod moves downward the presser-foot moves downward also and into the path of the weft which it taps with sufficient force to reduce their inertia in the required amount. When the lathe swings backward, the roller sides up out of the depression in the edge of the quadrant, and lifts the pivotal arm which in turn lifts the reciprocatable rod and the presser-foot. The described action of the presser-foot takes place very quickly and is repeated every time the lathe is swung forward and back, and a weft is drawn in between the warp-threads for incorporation into the fabric.

Under the construction just described, the presser-foot passes between the warp-threads and engages directly with the incoming wefts and accomplishes their retardation with the minimum expenditure of power and without straining or chafing the warp-threads, whereas prior to my invention, the presser-foot has not touched the wefts but has been adapted to simultaneously depress a number of warp-threads into contact therewith, the threads being in this manner chafed and weakened and their depression requiring the expenditure of considerable power.

A selvage is formed at each edge of the fabric by turning the ends of the wefts over upon themselves and weaving them into it, by means of two independent but like selvage mechanisms. Each of these mechanisms consists of a finger W provided at its lower end with an eye W' through which the turn-cord passes and shaped to operate closely in front of the selvage-beater $W^2$, which in this case is nothing more than the end reed cut off at its upper end and bent back into the same plane in which the lower end of the finger W is bent forward, the upper end of the said finger being carried back of the reeds and there secured to a long operating-lever $W^3$ fulcrumed to the rear face of the lathe and connected at its extreme lower end with the forward end of a horizontal lever $W^4$ fulcrumed at $W^5$ and provided at its rear end with a pin $W^6$ which is engaged by cams $W^7$ formed on the face of a cam-wheel $W^8$ which may be driven in any convenient way.

For convenience of description, I have shown in Fig. 21 of the drawings, the turning finger, the selvage-beater, the turn-cord $W^9$, the selvage-cord $W^{10}$ which may be composed of several cords if desired, and a weft $W^{11}$. The weft, as will be seen by that drawing, passes under the selvage cord and over the turn-over cord. Then when the turning-finger makes its inward movement, the turn-cord throws the end of the weft over, as shown by the drawings, after which the said end is beaten up by the selvage beater.

The fabric is kept flat by being passed under a roll X shown by Fig. 10 of the drawings and then over a breast-beam X' shown in the same figure.

The operation of my improvements have been so fully set forth in connection with the description of their construction that it is thought that a separate description of their operation will be unnecessary.

It is apparent that in carrying out my invention some changes in the construction herein shown and described may be made, I would therefore have it understood that I do not limit myself to such construction, but hold myself at liberty to make such changes and alterations as fairly fall within the spirit and scope of my invention.

I claim—

1. A loom for weaving short wefts, having a weft-feeding chain composed of links, each having a stationary jaw and a spring-actuated movable weft-holding jaw, the holding surfaces whereof are at a right angle to the length of the chain; in combination with means for moving the said movable jaws of the links against their springs, substantially as set forth.

2. A loom for weaving short-wefts, having a weft-feeding chain composed of links each having a stationary jaw and a spring-actuated movable weft-holding jaw adapted in its horizontal surface to receive a colored tablet or wafer, the holding surfaces of the said jaws being at about a right angle to the length of the chain substantially as described.

3. A loom for weaving short-wefts, having a weft-feeding chain composed of links, each having a stationary jaw and a spring-actuated weft-holding jaw provided with a recess and a colored tablet or wafer located in such recess, substantially as described.

4. A loom for weaving short-wefts, having a weft-feeding chain composed of links each having a stationary jaw and a spring-actuated weft-holding jaw, wedges for forcibly pushing back the said jaws at the proper time to release the wefts and means for operating the said wedges, substantially as described.

5. A loom for weaving short-wefts, having a weft-feeding chain composed of links, each having a stationary jaw and a spring-actuated weft-holding jaw, a wheel over which the chain passes, radially reciprocatable wedges mounted in the said wheel, and a cam for reciprocating the wedges, to, at the proper time, push back the spring-actuated jaws, and release the wefts, substantially as described.

6. A loom for weaving short-wefts, having a weft-feeding chain composed of links, each having a fixed and a movable jaw; a wheel over which the chain passes, radially reciprocatable wedges mounted in the said wheel and each having a transverse slot, a cam-plate mounted on the same center with the wheel, and having a cam in the form of a rib entering the slots of all of the wedges and holding them in place and reciprocating them; and means for oscillating the said plate, whereby the cam is caused to operate the wedges in pushing back the movable jaws of the links to release the wefts, substantially as described.

7. A loom for weaving short-wefts, having a weft-feeding chain composed of links each comprising an open frame adapted at its rear and forward ends to be attached to other corresponding links, and provided at its forward end with a jaw, and at its rear end with a web, and slotted between the same; a movable jaw mounted upon the frame between the said jaw and web and having its forward end turned down into the slot and beveled, and locked to the frame; a guiding-pin secured to the movable jaw, and playing through a perforation in the said web, a spiral spring encircling the said pin and means independent of the chain for engaging with the beveled end of the jaw for pushing the same back to release the weft, substantially as described.

8. A loom for weaving short-wefts, having two reciprocating weft-carriers located, opposite each other in line at opposite ends of the lathe, and constructed to transfer the wefts from one to the other alternately in the center of the fabric, two short-weft feeding-mechanisms respectively located at opposite ends of the loom, and means co-operating with the carriers for operating the same alternately to take a weft at every other inward movement, substantially as described.

9. A loom for weaving short-wefts, having two reciprocating weft-carriers located opposite each other in line at opposite ends of the lathe and constructed to transfer the wefts from one to the other alternately in the center of the fabric, and each having at its inner end two nipper jaws one of which is movable; and means for operating the movable nipper jaws of the carriers to grip and release the wefts, substantially as described.

10. A loom for weaving short-wefts, having two reciprocating weft-carriers located opposite each other in line at opposite ends of the lathe, and constructed to transfer the wefts from one to the other alternately in the center of the fabric, and each comprising an outer tube, a nipper jaw located at the inner end thereof, and a nipper jaw carrier located in the said tube and rotatable therein and provided at its inner end with a nipper jaw arranged to co-operate with that carried by the outer tube, and means for reciprocating the weft-carriers and rotating the nipper-jaw carriers, substantially as described.

11. A loom for weaving short-wefts, having two reciprocating weft-carriers located opposite each other in line at opposite ends of the loom, and each comprising an outer tube provided at its inner end with a nipper jaw, an inner tube located within the outer tube and rotatable therein and provided at its inner end with a nipper jaw arranged to co-operate with that first mentioned; and means for reciprocating the carriers and rotating their inner tubes, to cause them to transfer wefts from one to the other alternately in the center of the fabric, substantially as described.

12. A loom for weaving short-wefts, having two reciprocating weft-carriers respectively located opposite each other in line at opposite ends of the lathe, and each comprising an outer tube provided at its inner end with a nipper jaw and an inner tube located in the outer tube, rotatable therein and provided at its inner end with a nipper jaw, an independent guiding-rod entered into the outer end of each of the said inner tubes, and means for reciprocating the carriers, and rotating their inner tubes, whereby they are caused to transfer wefts from one to the other alternately in the center of the fabric, substantially as described.

13. A loom for weaving short-wefts, having two weft-carriers respectively located opposite each other in line at opposite ends of the loom lathe, each comprising an outer tube provided at its inner end with a nipper jaw, a nipper jaw-carrier located in the tube, rotatable therein, and provided at its inner end with a nipper jaw; a sliding block to which the outer end of the tube is secured, a rotatable head secured to the outer end of the nipper jaw-carrier which projects outwardly beyond the said sliding-block, and a pin located in the said rotatable head; and each weft-carrier having operating connections for reciprocating it applied to its sliding-block, and rotating wipers arranged to be engaged with the said pin to rotate the nipper jaw carrier and thus separate the nipper jaws, substantially as described.

14. A loom for weaving short wefts, having two weft-carriers respectively located opposite each other and in line at the opposite ends of the lathe, and each provided with a fixed and a movable nipper jaw located at its inner end and extending at a right angle to it, and with a movable part, the inner end whereof carries the said movable nipper jaw, and the outer end whereof extends to the outer end of the carrier; in combination with means for engaging with the outer ends of the said movable parts of the carriers to cause the movable nipper jaws thereof to move away from the fixed nipper jaws thereof, substantially as set forth.

15. A loom for weaving short-wefts, having two weft-carriers respectively located opposite each other in line at opposite ends of the loom-lathe, and co-operating to transfer the wefts from one to the other, alternately, in the center of the fabric, racks connected with the outer ends of the said carriers, and extending parallel therewith, pinions taking into the said racks, a shaft for the said pinions, means for reciprocating the racks through the said shaft which is thereto reversed in rotation, two short-weft feeding-mechanisms located at opposite ends of the loom, and means co-acting with the respective weft-feeding carriers to cause them alternately to take a weft at every other inward movement, substantially as described.

16. A loom for weaving short-wefts, having two weft-carriers respectively located opposite each other in line at opposite ends of the loom-lathe, co-operating to transfer the wefts from one to the other, alternately, in the center of the fabric, and each provided at its inner end with two nipper jaws, one of which is movable; two short-weft feeding-mechanisms located at opposite ends of the loom, means co-acting with the said carriers for causing them to alternately take a weft at every other inward movement; and a friction device combined with each carrier to break the inertia of the same at the end of its reciprocating movement, substantially as described.

17. A loom for weaving short-wefts, having two weft-carriers respectively located opposite each other in line at opposite ends of the loom-lathe and co-operating to transfer wefts from one to the other alternately in the center of the fabric, and a friction device combined with each carrier and comprising a friction-bar arranged parallel with the same and having frictional connection with the outer end thereof, the bar being reduced in transverse thickness along its center to relieve the friction at the center of the stroke of the carrier, substantially as described.

18. A loom for weaving short-wefts, having two weft-carriers respectively located opposite each other in line at opposite ends of the loom lathe and co-operating to transfer the wefts from one to the other alternately in the center of the fabric, a sliding-block applied to the outer end of each weft-carrier, power connections with the said block for reciprocating the carrier, a friction-bar arranged parallel with the carrier, and transversely reduced in thickness between its ends; and friction connection between the said sliding block and bar, whereby the inertia of the carrier is broken at the ends of its stroke, substantially as described.

19. A loom for weaving short-wefts, having two weft-carriers respectively located opposite each other in line at opposite ends of the loom-lathe, and co-operating to transfer wefts from one to the other alternately in the center of the fabric, a rack connected with each carrier, pinions and a shaft connecting the racks, a reciprocating rack for reversing the rotation of the said shaft, and pinions and gearing connections intermediate between the said reciprocating rack and shaft, substantially as described.

20. A loom for weaving short-wefts, having two reciprocating weft-carriers, respectively located opposite each other in line at opposite ends of the loom lathe and co-operating to transfer wefts from one to the other alternately in the center of the fabric, and each having at its inner end two nipper jaws, one of which is secured to a rotatable part; and rotatable wipers temporarily engaging with the said rotatable part of each carrier as the same is brought into range with them in its reciprocation substantially as described.

21. A loom for weaving short-wefts, having two reciprocating weft-carriers respectively located opposite each other and in line at opposite ends of the loom-lathe, and co-operating to transfer wefts from one to the other, alternately, in the center of the fabric, and each having at its inner end two nipper jaws, one of which is secured to a rotatable part; means for connecting the said carriers to operate in unison, causing them to simultaneously approach each other, and then to simultaneously retire; and a revolving wiper-shaft extending parallel with the carriers and carrying two sets of three wipers, of which one set co-acts with the rotatable part of one carrier, and the other set with the corresponding part of the other carrier, the said sets of wipers being constructed, arranged and timed so as to rotate the part with which they coact at the beginning and end of every alternate instroke, and to sustain it in its rotated position throughout the duration of every alternate outstroke, substantially as described.

22. A loom for weaving short-wefts, having two reciprocating weft-carriers respectively located opposite each other in line at opposite ends of the loom-lathe and constructed to transfer wefts from one to the other alternately in the center of the fabric and each having at its inner end two nipper jaws, one of which is carried by a rotatable part; a shaft mounted in the loom-lathe of the loom and provided at its respective ends with wipers engaging with the rotatable part of the carriers to temporarily rotate the said part so as to separate the nippers of the carriers, and power-connections between the shaft and a driving-shaft of the loom, substantially as described.

23. In a loom for weaving short-wefts, the combination with the lathe thereof, of a vertical foot adapted to extend down between the warp threads in position to stand directly over the incoming short-wefts, and power connections whereby the said foot is alternately raised above and depressed into the path of the wefts, substantially as described.

24. In a loom for weaving short wefts, the combination with the selvage-beater and the reeds thereof, of an operating-lever located back of the said reeds, a turning-finger having an eye for the turn-over cord, and shaped to operate in front of the beater, and having its upper end attached to the said lever, and means for operating the said lever to move the said finger in front of the beater, substantially as described.

25. In a loom for weaving short-wefts, the combination with a selvage-beater having its upper end bent back and broken away for clearance, of an operating-lever located back of the reeds and a turning-finger having an eye in its lower end and shaped to reciprocate transversely over the outer face of the said beater, and having its upper end bent back for attachment to the said operating-lever, substantially as described.

ALBERT W. JOHNSON.

Witnesses:
 GEO. D. SEYMOUR,
 FRED C. EARLE.